United States Patent [19]

Fucik

[11] 3,884,940
[45] May 20, 1975

[54] NEW BIS-(4,7-DIHYDROXYCOUMARINYL-3-)-ACETIC ACID

[75] Inventor: Karel Fucik, Prague, Czechoslovakia

[73] Assignee: SPOFA, United Pharmaceutical Works, Prague, Czechoslovakia

[22] Filed: Apr. 11, 1973

[21] Appl. No.: 350,157

[30] Foreign Application Priority Data
Apr. 12, 1972   Czechoslovakia ................... 2442-72

[52] U.S. Cl. ........................... 260/343.2 R; 424/283
[51] Int. Cl. .................................................. C07d 7/26
[58] Field of Search ............................... 260/343.2 R

[56] References Cited
UNITED STATES PATENTS

| | | | |
|---|---|---|---|
| 2,703,320 | 3/1965 | Robertson .................... | 260/343.2 X |
| 2,938,039 | 5/1960 | Fucik ............... | 260/343.2 |
| 3,729,405 | 4/1973 | Schrijver et al .............. | 260/343.2 X |
| 3,822,293 | 7/1974 | Bader et al. ..................... | 260/343.2 |

*Primary Examiner*—John M. Ford

[57] ABSTRACT

The new bis-(4,7-dihydroxycoumarinyl-3)-acetic acid of the formula

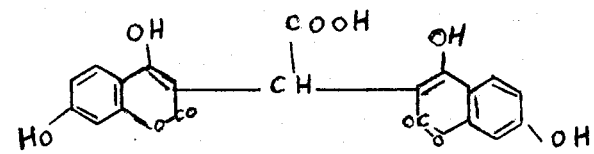

and the method of preparing it comprising reacting 4,7-dihydroxycoumarin with glyoxylic acid. The glyoxylic acid may be in the form of hydrate or a solution of hydrate.

12 Claims, No Drawings

NEW BIS-(4,7-DIHYDROXYCOUMARINYL-3-)-ACETIC ACID

This invention relates to the new bis-(4,7-dihydroxycoumarinyl-3)-acetic acid of the formula

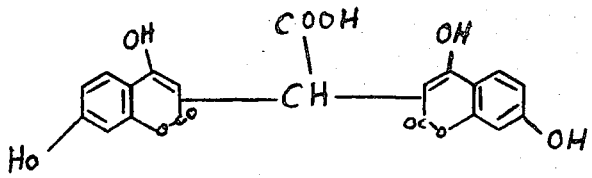

and the method of preparation thereof.

This new, hitherto not described, compound is an outstanding inhibitor of thrombocyte aggregation of wide therapeutic applicability, without an anticoagulant activity, which can be used clinically in prevention of postoperative thromboses and emboli. The free acid is administered perorally, the disodium salt solution prepared from a chromatographically pure substance, is administered parenterally. Evaluation according to G. V. R. Born (Nature 194,927 (1962)) shows that the compound has the highest known inhibitory action in the amount 25 μg (50% inhibition) on 1 ml of plasma. The usual tests show low toxicity of the substance.

According to this invention, the bis-(4,7-dihydroxycoumarinyl-3)-acetic acid is prepared by condensation of 4,7-dihydroxycoumarin with glyoxylic acid whereupon the obtained product is contingently transformed into a salt, preferably into a disodium salt.

The reaction can be carried out with glyoxylic acid hydrate or with hydrate solution. In this case a reaction mixture from electrolysis of oxalic acid may serve as a source of glyoxylic acid. The reaction medium can be water, or a water-miscible organic solvent, either aqueous or anhydrous, preferably 20% aqueous acetone, free of aldehydes and alcohols, and the reaction is carried out at the temperature of the boiling point of the reaction mixture.

In the procedure according to this invention, it is necessary to start from a chromatographically pure 4,7-dihydroxycoumarin, and also the obtained bis-(4,7-dihydroxycoumarinyl-3)-acetic acid must be chromatographically pure for the therapeutic parenteral application. Both compounds can be evaluated either spectroscopically or by a thin layer chromatography on silica gel in the system benzene-methanol-acetone-acetic acid (7:2:0.5:0.5) using the known detection (K. Fucik, S. Koristek: Chem. listy 45, 190 (1951)). In order to obtain a product of desired quality the reaction medium must not contain aldehydic or alcoholic compounds which would allow side-reactions.

Although the reaction takes place with satisfactory yields even in an aqueous-ethanolic medium, the product is contaminated with traces of the formed ethyl ester which cannot be removed by several crystallizations and which goes over even into the disodium salt. The aqueous solutions of this salt, used for parenteral application, get colored in a short time. Therefore the reaction medium of choice is aqueous acetone, free of aldehydes and alcohols (especially methanol). The reaction in this medium affords the free acid of a suitable quality, which can be used not only for the preparation of oral medicaments but also for the transformation into the disodium salt which affords colorless and stable solutions for parenteral application.

The isolation procedure of bis-(4,7-dihydroxycoumarinyl-3-)-acetic acid is very simple. Thanks to its low solubility, the acid separates in the crystalline form already from the hot reaction mixture and mere filtration and washing with aqueous acetone is sufficient. The cold mother liquor deposits further amount of product which is then crystallized from acetone. The total yield is above 90%.

The bis-(4,7-dihydroxycoumarinyl-3)-acetic acid is a colorless compound, containing 1 molecule of crystal water, slowly decomposing above 245°C. Its ionization constants in 50% ethanol are $pK_1$:3.0; $pK_2$:7.1; $pK_3$:10.0. To satisfy the purity test, the solution of 100 mg of the acid and 80 mg $NaHCO_3$ in 20 ml of water must remain indefinitely colorless.

The disodium salt of the bis-(4,7-dihydroxycoumarinyl-3)-acetic acid, which is the starting substance for preparation of injection solutions, is obtained simply by reaction of the acid with sodium hydrogen carbonate in water. The salt is precipitated by the addition of acetone, free of aldehydes and alcohols.

The method according to this invention is further illustrated by examples of execution in which the preparation under various conditions is described.

EXAMPLE 1

A mixture of methanol-free 20% aqueous acetone (900ml) and chromatographically pure 4,7-dihydroxycoumarin (35.6 g) is boiled till dissolution and then glyoxylic acid hydrate (9.6 g) is added under stirring. After about 10 minutes the solution becomes turbid and crystals begin to separate. The mixture is refluxed for 1 hour and the separated bis-(4,7-dihydroxycoumarinyl-3)-acetic acid is filtered with suction from the hot solution, washed with 20% aqueous acetone and dried at 40°–50°C in vacuo, yielding 92–95% of the chromatographically pure product, which decomposes slowly above 245°C. Upon cooling, the mother liquors afford another part of the product, which is crystallized from acetone.

EXAMPLE 2

A slurry of chromatographically pure 4,7-dihydroxycoumarin (35.6 g) in methanol-free acetone (200 ml) is boiled for 10 minutes, glyoxylic acid hydrate (9.6 g) is added and the mixture is boiled for 1 hour. The separated product is filtered with suction while hot and the mixture is worked up as described in Example 1. The yield of the chromatographically pure bis-(4,7-dihydroxycoumarinyl-3)-acetic acid is about 80%. From the mother liquor another portion is obtained which is purified by crystallization from acetone.

EXAMPLE 3

To a reaction mixture from electroreduction of oxalic acid, containing 7.8 g of glyoxylic acid, acetone (methanol-free) is added (in the amount of 20% vol) followed by chromatographically pure 4,7-dihydroxycoumarin (36.5 g), and the mixture is boiled for 1 hour under reflux. The separated product is filtered from the hot solution and treated in the same manner as described in Example 1; yield about 90%.

EXAMPLE 4

Chromatographically pure 4,7-dihydroxycoumarin (35.6 g) is dissolved in boiling 20% aqueous ethanol (900 ml), then glyoxylic acid hydrate (9.6 g) is added and the stirred mixture is refluxed for 1 hour. The work-up procedure described in Example 1 affords the product in 88% yield. The bis-(4,7-dihydroxycoumarinyl-3)-acetic acid prepared in this manner is suitable only for peroral application because even several crystallizations failed to give a substance which affords colorless, stable injection solutions.

EXAMPLE 5

A slurry of chromatographically pure 4,7-dihydroxycoumarin (35.6 g) and glyoxylic acid hydrate (9.6 g) in water is boiled till the reaction is complete. The separated product is isolated as described in Example 1 and purified by crystallization from acetone.

EXAMPLE 6

Preparation of the disodium salt:
Chromatographically pure bis-(4,7-dihydroxycoumarinyl-3)-acetic acid (4.1 g) is mixed with sodium hydrogen carbonate (1.68 g) and water (15 ml) to give clear solution which is then treated with methanol-free acetone (31 ml) and allowed to crystallize. When the disodium salt slowly begins to separate, another acetone (30 ml) is added, the mixture is cooled and the crystals are sucked off, washed with acetone, ether and dried, affording 4 g of product which contains 1 molecule of crystal water. A 10% aqueous solution of the salt has pH 6.7 to 7.0, is colorless, clear and stable. It is sterilized by filtration through glass filter of the porosity $G_5$.

Although the invention is illustrated and described with reference to a plurality of preferred embodiments thereof, it is to be expressly understood that it is in no way limited to the disclosure of such a plurality of preferred embodiments, but is capable of numerous modification within the scope of the appended claims.

What is claimed is:

1. The bis-(4,7-dihydroxycoumarinyl-3)-acetic acid of the formula

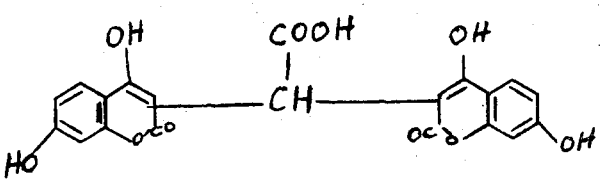

2. The method of preparing bis-(4,7-dihydroxycoumarinyl-3)-acetic acid which comprises reacting 4,7-dihydroxycoumarin with glyoxylic acid.

3. The method according to claim 2, comprising transforming the obtained product into a salt.

4. The method according to claim 2, comprising transforming the obtained product into a disodium salt.

5. The method according to claim 2, wherein the glyoxylic acid in the form of one of the group consisting of hydrate and a solution of hydrate.

6. The method according to claim 2, wherein the glyoxylic acid is derived from a reaction mixture from the electrolytic reduction of oxalic acid.

7. The method according to claim 2, wherein the reaction is carried out in water.

8. The method according to claim 2, wherein the reaction is carried out in an aqueous organic solvent.

9. The method according to claim 2, wherein the reaction is carried out in an anhydrous water-miscible organic solvent.

10. The method according to claim 2, wherein the reaction is carried out in 20% aqueous acetone, free of aldehydes and alcohols.

11. The method according to claim 2, wherein the reaction is carried out at the temperature of the boiling of the reaction mixture.

12. The method according to claims 5, wherein the reaction is carried out at the temperature of the boiling point of the reaction mixture.

* * * * *